United States Patent [19]

Gerberick

[11] 4,261,687
[45] Apr. 14, 1981

[54] HORIZONTAL FLUID-DRIVEN DEVICE

[76] Inventor: Horace E. Gerberick, 359 Lincolnway West, Abbottstown, Pa. 17301

[21] Appl. No.: 55,385

[22] Filed: Jul. 9, 1979

[51] Int. Cl.³ .......................... F03D 3/00; F03D 9/00
[52] U.S. Cl. ..................................... 416/117; 40/473
[58] Field of Search .............. 416/117, 140 R; 40/473

[56] References Cited

U.S. PATENT DOCUMENTS

| | | | |
|---|---|---|---|
| 580,761 | 4/1897 | Bratka | 416/117 |
| 619,005 | 2/1889 | Whidden | 416/117 |
| 662,737 | 11/1900 | Puszkar | 416/118 |
| 692,364 | 2/1902 | Russell | 416/117 |
| 1,076,713 | 10/1913 | Southwick | 416/119 |
| 1,087,586 | 2/1914 | Ivancevich | 416/117 R |
| 1,555,776 | 9/1925 | Twiford | 416/118 |
| 1,846,112 | 2/1932 | James | 40/473 |
| 2,094,603 | 10/1937 | Keene | 416/118 |
| 2,532,572 | 12/1950 | Reeves | 40/412 |
| 2,707,521 | 5/1955 | Rodgers | 416/207 |
| 3,093,194 | 6/1963 | Rusconi | 416/119 |
| 3,897,170 | 7/1975 | Darvishian | 416/197 |
| 3,995,170 | 11/1976 | Graybill | 290/55 |
| 4,039,849 | 8/1977 | Mater | 290/55 |
| 4,047,833 | 9/1977 | Decker | 415/2 |

FOREIGN PATENT DOCUMENTS

| | | | |
|---|---|---|---|
| 498294 | 1/1951 | Belgium | 416/117 |
| 623361 | 4/1933 | Fed. Rep. of Germany | 416/140 |
| 834077 | 3/1952 | Fed. Rep. of Germany | 416/117 |
| 909873 | 5/1946 | France | 416/117 |
| 266432 | 8/1929 | Italy | 416/112 |

Primary Examiner—William L. Freeh
Attorney, Agent, or Firm—Samuel M. Learned, Jr.

[57] ABSTRACT

A horizontal fluid-driven device for rotary motion comprised of a planar support surface upon which is assembled a radially spaced array of counterbalanced stoplock pivot vanes operable by impingement thereon of a fluid current force to cycle, automatically and sequentially, the pivot vanes thereof unidirectionally through rotary displacement maximum drive to minimum resistance to maximum drive configurations within the fluid current, irrespective of the fluid current direction, with use of the device herein taught for landscape ornamentation and commercial display attention attracting applications.

1 Claim, 8 Drawing Figures

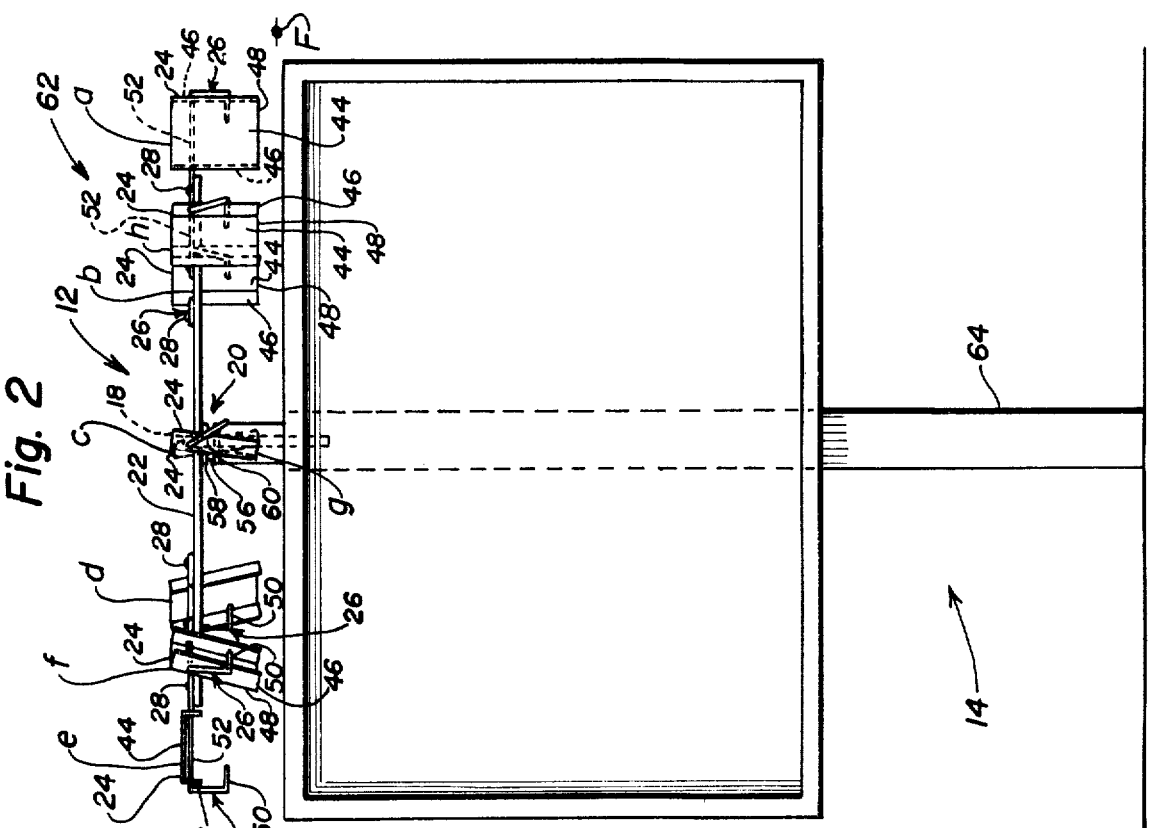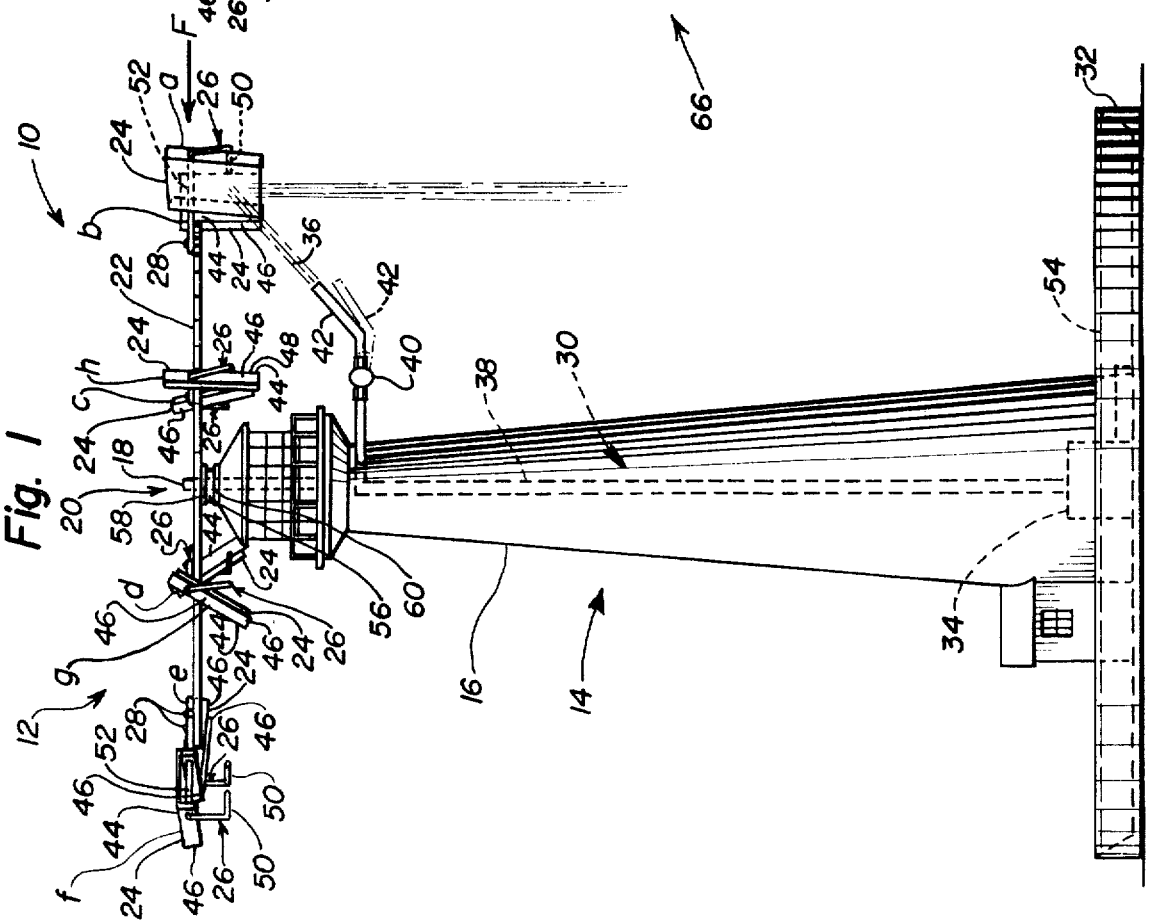

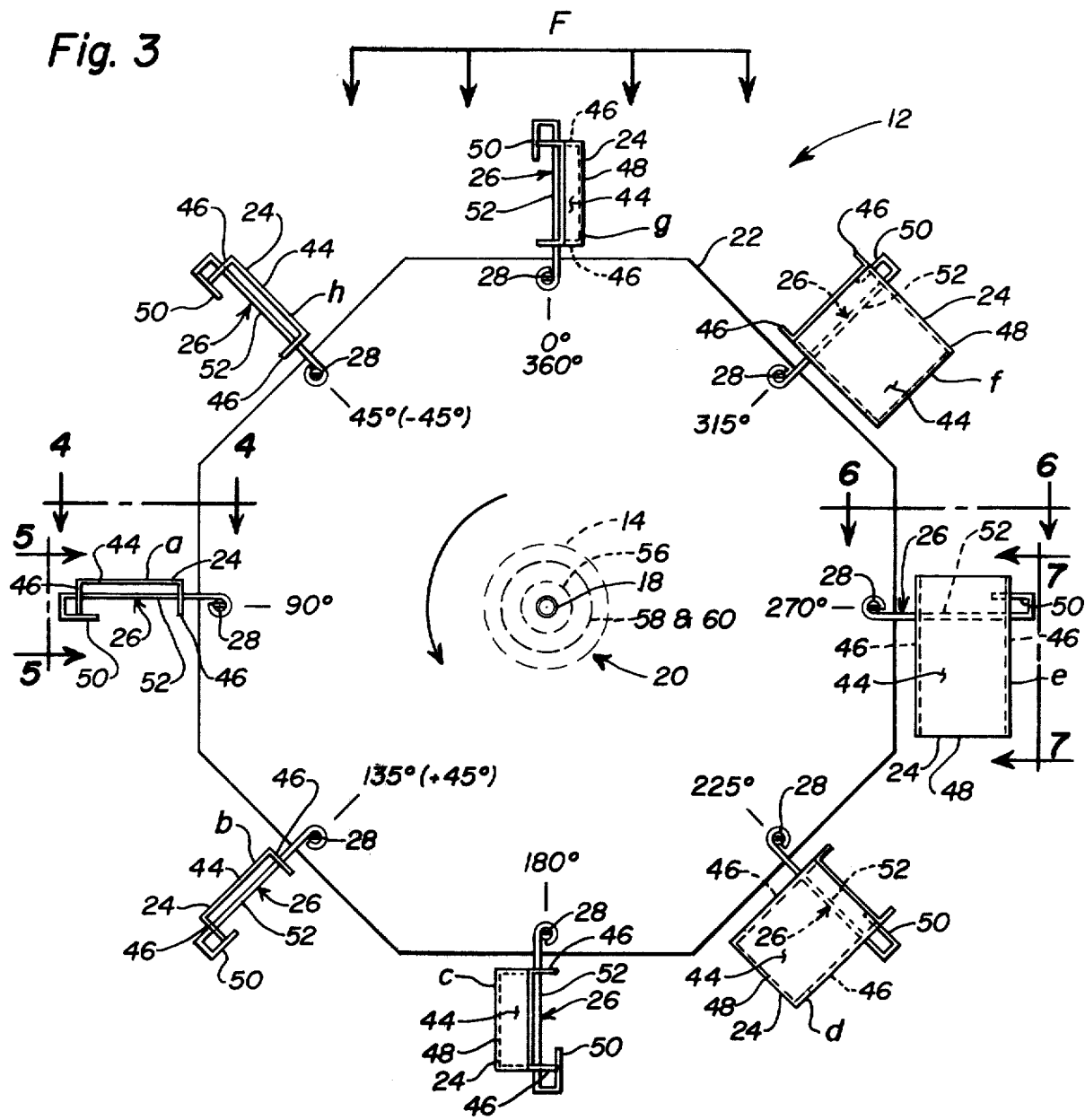
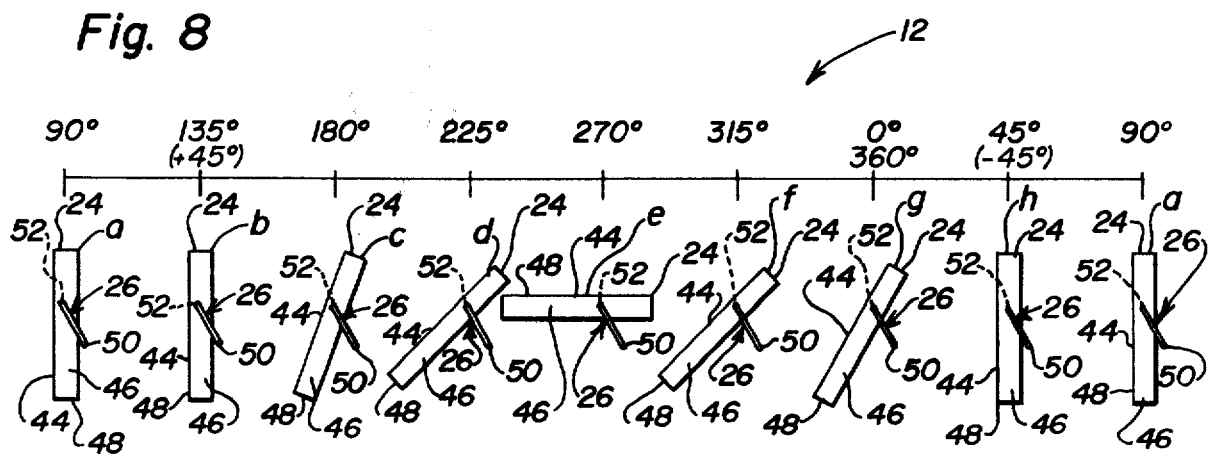

HORIZONTAL FLUID-DRIVEN DEVICE

BACKGROUND OF THE INVENTION

The instant invention relates to a horizontally mounted fluid-driven device characteristic of those items generally employed within residential property grounds for purposes of landscape ornamentation and the like, with an alternate use of said device in a commercial display application such as upon a sign board or the like for purposes of attracting and directing the attention of passersby thereto, wherein the fluid medium whereby driven motion is imparted to said device may be either by naturally occurring atmospheric wind current forces acting upon various of a planar plurality of spaced radially configured normally vertically dependent horizontally mounted pivot vanes to thereby cause rotary displacement of said device, with the alternate use of a directed water stream upon various of the planar plurality of spaced radially configured normally vertically dependent horizontally mounted pivot vanes to provide an alternate and/or supplemental fluid-drive means force in combination with naturally occurring atmospheric wind current forces within the ambient atmosphere air envelope, to also thereby impart rotary motion to said device by another drive means but in a manner similar to that caused by the naturally occurring wind current forces as will hereinafter be more fully detailed and described, and in particular the automatic cyclic positioning of said pivot vanes from drive through feather (i.e., minimum vane surface resistance to drive fluid current direction) to drive position configurations during driven rotary motion displacement of said device.

Heretofore, certain wind motors have employed radially spaced pivotal blades or vanes mounted in a horizontal configuration on axes perpendicular to the axis of rotation of the impeller per se of the motor device wherein the blade or vane drive and feather positions are either operable or in part manually adjustable by compound mechanical means as respectively taught in U.S. Pat. No. 1,087,586 to Ivancevich, dated Feb. 17, 1914, and U.S. Pat. No. 2,707,521 to Rogers, dated May 3, 1955, rather than being automatically operable as taught by the instant invention.

Exemplary of a wind-driven device for attracting attention to billboards is a teaching embodied in that disclosure as set forth by Reeves in U.S. Pat. No. 2,532,572 dated Dec. 5, 1950, wherein a plurality of radially spaced minature sailboats are assembled upon a horizontally planar pivotal support surface which is displaced in rotary motion by wind current forces acting upon the vertically positioned flexible and deformable sail surfaces respectively of said minature sailboats, with, however, the attendant problem of sail backwinding as is well known to those in the art basics of sailing boats.

In U.S. Pat. No. 1,076,713 to Southwick, dated Oct. 28, 1913, a horizontally mounted air or water driven motor is provided with a plurality of radially spaced vertically disposed support members respectively between which are positioned vertically pivotal rod-connected blades or vanes which close and open in a shutter-like operable manner as rotationally presented to the current direction of a drive fluid (i.e., either wind or water) to drive or feather as the case may be relative to drive fluid current direction and radial rotation position of said vertically pivotal rod-connected blades or vanes with respect thereto. Structural variations evolved from the above-cited Southwick teaching are as respectively taught in U.S. Pat. Nos. 1,555,776 to Twiford, dated Sept. 29, 1925; 2,094,603 to Keene, dated Oct. 5, 1937; 3,897,170 to Darvishian, dated July 29, 1975; 4,039,849 to Mater et al, dated Aug. 2, 1977; and 4,047,833 to Decker, dated Sept. 13, 1977.

Additional horizontally mounted air, wind or current motors, with vane means providing variable pitch capability relative to the fluid current drive-force direction and further with respect to radial rotation position of the motor vanes thereto are set forth in U.S. Pat. Nos. 662,737 to Puszkar, dated Nov. 27, 1900, and 3,995,170 to Graybill dated Nov. 30, 1976, both teaching flexible vanes operable on axes parallel to the axis of impeller rotation, and functionally similar to the foregoing, but structurally teaching rigid curved blade vanes providing variable pitch through compound mechanical linkage means, is that disclosure as set forth in U.S. Pat. No. 3,093,194 to Rusconi, dated June 11, 1963.

It should be understood that some of the features of the instant invention have, in some respects, certain structural and functional similarities to those teachings separately set forth in the prior art disclosures heretofore cited and briefly discussed. However, as will hereinafter be pointed out, the instant invention is distinguishable from said earlier inventions in one or more ways in that the present invention has utility features and improvements in the art of horizontal fluid-driven devices not heretofore known.

SUMMARY OF THE INVENTION

It is the principal object of the present invention to provide a horizontally mounted fluid-driven device which embodies a planar plurality of spaced radially configured normally vertically dependent horizontally mounted pivot vanes cyclicly operable, unidirectionally and automatically during fluid-driven rotary motion displacement thereof, to pivotally position from drive to feather to drive mode configurations, sequentially, during rotary motion displacement of said device and thereby substantially maximize the impinging fluid current drive-force potential upon said pivot vanes in accomplishing driven rotary motion displacement of said device.

It is another object of the present invention to provide a horizontally mounted fluid-driven device embodying a pivot vane plurality operable to impart rotary motion displacement thereto by impingement thereon of naturally occurring atmospheric wind current forces, with an alternate use application of a directed water stream as the fluid current drive-force means.

It is a further object of the present invention to provide a horizontally mounted fluid-driven device also further embodying a pivot vane plurality substantially operable in the foregoing manner, irrespective of the fluid current drive-force direction.

Still another object of the present invention is to provide a horizontally mounted fluid-driven device having counterbalanced pivot vanes respectively in combination with stop-lock mounting assemblies therefor whereby the automatic pivotal positioning thereof from drive to feather to drive mode configurations during fluid-driven rotary motion displacement of said device is enabled.

It is yet another object of the instant invention to provide a horizontally mounted fluid-driven device which may be employed upon a suitable support structure as a novel residential property lawn ornamentation item.

It is also an object of the present invention to provide a horizontally mounted fluid-driven device which may be employed also as a means for attention attracting and directing of passersby to commercial displays such as sign boards and the like situate adjacent public roadways.

BRIEF DESCRIPTION OF THE DRAWINGS

FIG. 1 is a side elevation of the landscape ornamentation embodiment of a horizontal fluid-driven device comprising the instant invention, also illustrating therein the alternate and/or supplemental fluid-drive means embodiment in combination therewith.

FIG. 2 is a side elevation of the commercial display embodiment of said horizontal fluid-driven device comprising the instant invention.

FIG. 3 is a top plan view of the horizontal fluid-driven device comprising the instant invention, generally as the same would appear during a typical fluid-driven rotary motion displacement cycle thereof.

FIG. 8 is a diagrammatic linear side elevation exemplary of the planar plurality of spaced radially configured normally vertically dependent horizontally mounted pivot vanes of the instant invention illustrating therein the rotationally angular displacement automatic cyclic positioning of said pivot vanes from maximum rotary displacement drive through maximum feather and back to maximum rotary displacement cycle modes of the horizontal fluid-driven device hereof.

DETAILED DESCRIPTION OF THE INVENTION

Figure 4:
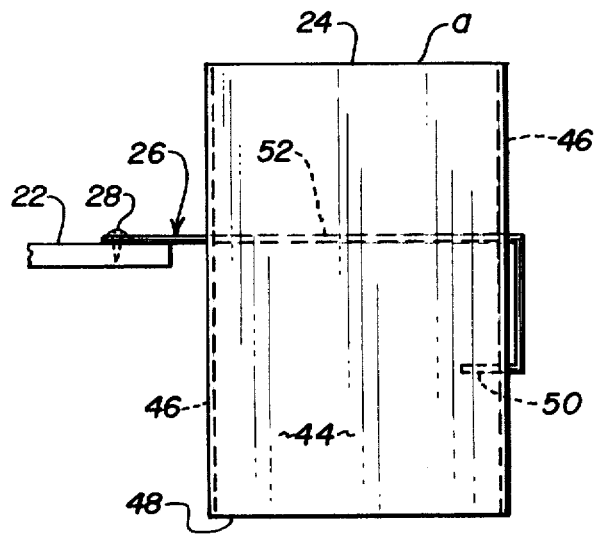
FIG. 4 is an enlarged front elevation of the fluid-drive current impingement surface of a spaced radially configured normally vertically dependent horizontally mounted pivot vane positioned in the maximum rotary displacement drive mode as shown in FIG. 3 and seen along the line 4—4 thereof.

Referring to FIG. 1, the landscape ornamentation embodiment 10 of the present invention, being a horizontal fluid-driven device 12, is shown operationally assembled upon and in combination with a vertically disposed support structure 14 exemplified and rendered herein for purposes of illustration and explanation as a minature lighthouse structure 16 having rotatably installed thereto by means of slidable insertion upon an upwardly disposed supportive and retaining pintle 18 secured centrally intermediate the top portion on said minature lighthouse structure 16 said present invention 12, which is comprised of a radial rotation bearing assembly 20 interposed by slidable insertion upon said upwardly disposed supportive and retaining pintle 18 vertically intermediate and in horizontal disposition between the top of said minature lighthouse structure 16 and the centrally intermediate underside surface opening periphery of a geometrically shaped planar support member 22 to which is assembled upon the upper surface thereof a spaced radially configured array of counterbalanced stop-lock normally vertically dependent horizontally mounted pivot vanes 24 respectively by means of a pivot vane stop-lock bracket assembly 26 each of which is secured in spaced radially configured array disposition to the upper surface of said geometrically shaped planar support member 22 by a screw 28. As an additional component of the landscape ornamentation embodiment 10 of the present invention 12 there is also provided a directed water stream assembly 30 comprised of a water source reservoir 32 having placed therein a water pump 34 from which is pumped a water stream 36 through a conduit 38 being further provided at the delivery end thereof with a pivotally adjustable ball socket connector 40 whereby the water stream delivery nozzle 42 connectably communicating therefrom may be suitably adjusted to properly direct said water stream 36 for impingement upon the pivot vane fluid current drive surface 44 of said spaced radially configured array of counterbalanced stop-lock normally vertically dependent horizontally mounted pivot vanes 24 to thus provide an alternate and/or supplemental fluid-drive means force in combination with or place of the normally relied upon drive force means of naturally occurring atmospheric wind currents within the ambient atmosphere air envelope.

Referring again to FIG. 1 to describe in greater detail the component parts of said landscape ornamentation embodiment 10 of the present invention 12, as well as explain the operation thereof, wherein it is to be understood the same is normally installed at a suitable outdoor location such as upon residential property grounds or the like for the purposes of providing ornamentation. It is also to be understood, however, embodiment 10 of the present invention 12 is not necessarily limited to outdoor use and may likewise be employed for ornamentation purposes within residential gardens either indoor or out, for fish pond ornamentation, or in other such indoor or outdoor ornamentation applications.

Operation of said embodiment 10 of the present invention 12, presuming first the imparting of rotary motion thereto by naturally occurring wind current forces "F", the prevailing direction of which for purposes of instant explanation is as indicated by the arrow F as shown in FIG. 1, is as follows. First, a fluid current force, as instantly being considered, wind for example, acts upon the spaced radially configured array of counterbalanced stop-lock normally vertically dependent horizontally mounted pivot vanes from the then prevailing wind current force direction F, impinging upon the pivot vane fluid current drive surfaces 44 of those pivot vanes 24 incidentally positioned normal or at near-normal angle (90-degrees plus or minus forty-five degrees) thereto, which in FIG. 1 are respectively represented by that pivot vane supplementally shown as "a" for the normal (90-degree) wind force direction incidental orientation configuration and "b" and "h" respectively for the plus and minus forty-five degree wind force direction incidental orientation configurations, which, it is to be understood, such designations of supplemental pivot vane configurations are relative to prevailing wind current force direction F and are, for purposes of instant explanation and description identified as such.

It will be noted, as shown by pivot vane 24 supplemental designation a, as seen in FIG. 1, the prevailing wind current force direction F is normal to the pivot vane fluid current drive surface 44 thereof, and impinges thereon at a 90-degree angle thereto, thus forcing the pivot vane wing 46 of the downward depending counterbalance portion 48 thereof against the stop-lock arm projection 50 of the pivot vane stop-lock bracket assembly 26 pivotally about the pivot vane axle 52 thereof, whereupon the prevailing wind current impingement force thus imparts driven rotary motion to the geometrically shaped planar support member 22, unidirectionally, about the upwardly disposed supportive and retaining pintle 18. Additional rotary drive force effect is imparted to the geometrically shaped planar support member 22 from angular impingement of the prevailing wind current force direction F respectively upon pivot vanes 24 supplementally designated as b and h, also dependently configured generally in the above-described stop-lock positions as shown.

Upon rotary motion being imparted to the geometrically shaped planar support member 22 as above-described, both the effects of air density resistance and prevailing wind force direction come to further act upon certain of other of said pivot vanes 24, but, however, in a manner such as to cause the same, as provided by the pivotal counterbalanced structure thereof, to progressively present a diminishing rotary driven displacement resistance surface configuration, that is to say, "feather", wherein pivot vane 24 supplemental designations "c" and "d" illustrate the rotary progression displacement of said geometrically shaped planar support member 22 relative thereof to progressive pivot vane 24 feathering, and pivot vane 24 supplemental designation "e" shows said pivot vane 24 fully feathered as the unidirectional displacement leading edge thereof is presented full-face to the prevailing wind current force direction F to thereby also present a minimum rotary displacement drive resistance configuration. As further driven rotary displacement of said geometrically shaped planar support member 22 progresses about said upwardly disposed supportive and retaining pintle 18 the relative positions of said pivot vanes 24 to the prevailing wind current force direction F assumes the respective configurations as shown by pivot vane 24 supplemental designations "f" and "g", wherein the feathering effect due to air density resistance is progressively overcome by the counterbalanced moment of the pivot vane structure and the relative pivotal re-orienting thereof to prevailing wind current force direction which operates to return said pivot vane 24 to the stop-lock full drive position a, being the pivot vane normal (90-degree) wind force incidental orientation configuration point of beginning in the cyclic pivot vane 24 drive/feather/drive operation of said horizontal fluid-driven device 12 of the present invention as above described.

Also illustrated in FIG. 1 is a supplemental fluid-drive current means for obtaining rotary motion displacement of the landscape ornamentation embodiment 10 of the present invention 12, being the directed water stream assembly 30 comprised of a water recirculating system wherein a water stream 36 is pumped from a water source 54 and circulated by means of the water pump 34 from the water source reservoir 32 through conduit 38 to the water stream delivery nozzle 42 such that said water stream 36 may thereby, as an alternate and/or supplemental fluid-drive medium force complementary to naturally occurring prevailing wind current force F, be suitably directed upon sequentially passing pivot vane 24 fluid current drive surfaces 44 configured in the stop-lock position, by means of the pivotally adjustable ball socket connector 40 communicably joining said conduit 38 to said water stream delivery nozzle 42, to thereby impart rotary driven motion to said geometrically shaped planar support member 22, wherein the cyclic drive/feather/drive operation of the pivot vanes 24 of said horizontal fluid-driven device 12 of the present invention, within the ambient envelope of air density resistance and/or combined with complementary prevailing wind current force direction F, operates as previously described when said device 12 is driven solely by the effects of a prevailing wind current force direction F.

Irrespective of the fluid-drive medium or relative combinations thereof, it should be noted that driven rotary motion of said device 12 is stabilized by the pivot vane wing 46 structures of said pivot vanes 24 during rotary motion cyclic drive/feather/drive operation thereof, which rotary motion displacement is further enhanced by the friction reducing radial rotation bearing assembly 20 comprised of a roller bearing 56 retained in a central axial position by the insertion thereof upon the upwardly disposed supportive and retaining pintle 18, wherein said bearing 56 operates upon the upper bearing washer 58 and lower bearing washer 60 respectively in interposed disposition therebetween as said device 12 is displaced in driven rotary motion.

The present invention, being said device 12, may be constructed from wood, or metal, or plastics, but any other suitable materials or combinations thereof or of the foregoing may also be used.

Referring to FIG. 2, which is the commercial display embodiment 62 of the horizontal fluid-driven device 12 of the present invention, showing the same operationally installed upon and in combination with a sign post 64, which further serves to support also an exemplary commercial sign 66, wherein the rotary driven operation of said device 12, in the instant application of serving as a means to attract and draw the attention of passersby thereto and consequently also to said exemplary commercial sign 66, is by the effects of prevailing wind current force direction F in that operational manner of drive/feather/drive sequence as previously described in detail in consideration of FIG. 1. It should also be noted that the supplemental lower case letter designations in identification of pivot vanes 24 in FIG. 2 correspond respectively to the pivot vane wind force incidental orientation configurations of FIG. 1, and in all functional respects of operation of said device 12 in rotary driven motion by a prevailing wind current force direction F, is identical.

In FIG. 3 an enlarged top plan view of the horizontal fluid-driven device 12 of the present invention, whether it be in the landscape ornamentation embodiment 10 application as illustrated in FIG. 1, or the commercial display embodiment 62 application as illustrated in FIG. 2, is illustrated, showing particularly the sequential drive/feather/drive cyclic progressive operation of pivot vanes 24 with respect thereof incidentally to a prevailing wind current force direction F, wherein the 90° pivot vane 24 supplemental designation a is the full drive position and the 270° pivot vane 24 supplemental designation e is the full feather position, with the respective pivot vane 24 cyclic configurations therebetween from full drive to full feather, and from full feather back to full drive, wherein the cooperative structural relation between the outer pivot vane wing 46 and the stop-lock arm projection 50 in accomplishing the cyclic pivot vane 24 stop-lock drive configuration, thereby imparting and causing rotary displacement to and of the geometrically shaped planar support member 22, is further detailed.

Figure 5:
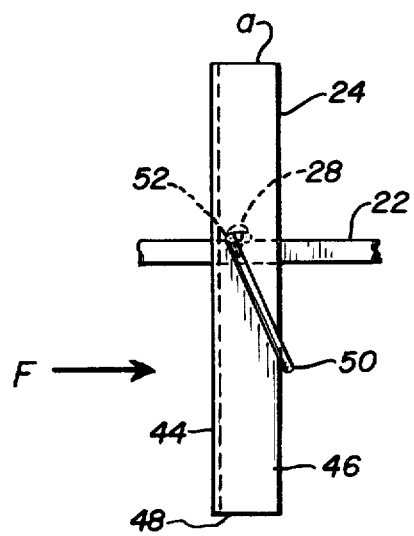
FIG. 5 is an enlarged side elevation of the spaced radially configured normally vertically dependent horizontally mounted pivot vane illustrated in FIG. 4 but as shown in FIG. 3 and seen along the line 5—5 thereof.

Considering next the enlarged pivot vane 24 illustrations as shown in FIG. 4 and FIG. 5, therein depicting in greater detail, as previously described, said pivot vane 24 cyclicly configured in the full drive configuration with the outer pivot vane wing 46 in compressive fixment against the stop-lock arm projection 50 of the pivot vane stop-lock bracket assembly 26, respectively as viewed perpendicular (normal) to the pivot vane fluid current drive surface 44 as seen along the line 4—4 of FIG. 3 and then in corresponding side elevation thereof as seen along the line 5—5 of FIG. 3.

Figure 6:
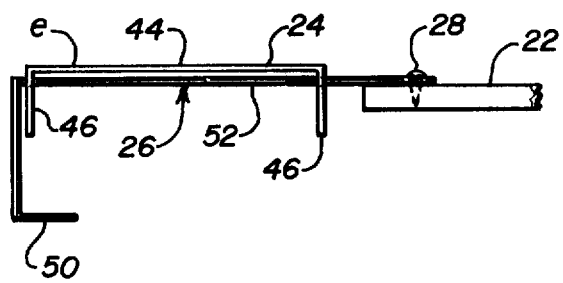
FIG. 6 is an enlarged front elevation of the fluid-drive current feather surface of a spaced radially configured normally vertically dependent horizontally mounted pivot vane positioned, however, in the maximum feather mode as shown in FIG. 3 and seen along the line 6—6 thereof.
Figure 7:
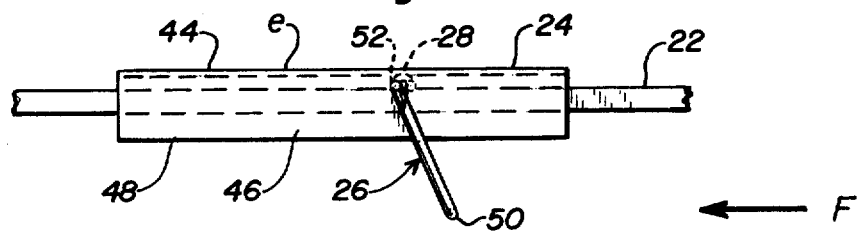
FIG. 7 is an enlarged side elevation of the spaced radially configured normally vertically dependent horizontally mounted pivot vane illustrated in FIG. 6 but as shown in FIG. 3 and seen along the line 7—7 thereof.

Considering now the enlarged pivot vane 24 illustrations as shown in FIG. 6 and FIG. 7, therein depicting in greater detail, as previously described, said pivot vane 24 cyclicly configured in the full feather configuration wherein minimum vane surface area, i.e., the leading edge thereof only, is presented full-face to the fluid drive current (wind) force direction F with the pivot vane wing counterbalance portion 48 pivotally elevated about the pivot vane axle 52 to be on-line and parallel with the geometrically shaped planar support member 22 and the respective pivot vane wings 46 serving to provide aerodynamic guidance stability to said pivot vane 24 in the full feather configuration as seen along the line 6—6 of FIG. 3 and then in corresponding side elevation thereof as seen along the line 7—7 of FIG. 3.

Referring lastly to FIG. 8, which is a diagrammatic side elevation of the horizontal fluid-driven device 12 of the present invention, wherein is illustrated linearly a progressive radial rotation displacement cycle of said device 12 showing the relative pivot vane 24 configurations from a full drive start point through full feather and back to the full drive start point positions as previously illustrated and described in detailed consideration of FIGS. 1 through 3 inclusive.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. A horizontal fluid-driven device for landscape ornamentation adapted to provide fixed unidirectional rotary displacement motion incidental to impingement thereupon of a fluid current drive force comprised of a directed water stream in combination with a naturally occurring flow of atmospheric wind, an octagonal shaped planar support member provided with an opening through the axis of planar symmetry thereof, an upwardly disposed supportive and retaining pintle secured within and upwardly projecting axially from a vertically disposed support structure in the form of a minature lighthouse provided with a directed water stream assembly said vertically disposed support structure erected relatively perpendicular to a horizontal plane wherein said pintle is adapted to insertably receive in closely complementary communication the opening of said otagonal shaped planar support member, a radial rotation bearing assembly provided with an opening therethrough and adapted for insertable engagement in closely complementary communication upon said pintle in interposed communicating rotational bearing relationship between said vertically disposed support structure upper surface and said octagonal shaped planar support member under surface, a plurality of radially spaced normally vertically dependent pivot vanes of eight in number respectively secured by a pivot vane stop-lock bracket assembly to the upper planar surface of said octagonal shaped planar support member respectively at regularly repeating equal angular displacement distances relative to said opening through the axis of planar symmetry of said octagonal shaped planar support member, said pivot vanes respectively adapted for impingement engagement by said fluid current drive force to thereupon operationally cycle automatically from a drive configuration mode pivotally to a feather configuration mode and then pivotally return to said drive configuration mode within said fluid current drive force flow while simultaneously imparting unidirectional rotary displacement motion to said octagonal shaped planar support member of said horizontal fluid-driven device.

* * * * *